INVENTOR
EDMOND P. WARNERY

INVENTOR
EDMOND P. WARNERY

Karl G. Ross
AGENT

Sept. 20, 1966   E. P. WARNERY   3,273,899
ROTARY SEAL WITH CONTINUOUS GAS FLOW-EXCLUSION OF INGRESS
Filed April 2, 1963   3 Sheets-Sheet 3

INVENTOR
EDMOND P. WARNERY

Karl G. Ross

AGENT

United States Patent Office 3,273,899
Patented Sept. 20, 1966

3,273,899
ROTARY SEAL WITH CONTINUOUS GAS FLOW-EXCLUSION OF INGRESS
Edmond P. Warnery, Boulogne, Seine, France, assignor to The Compagnie Francaise Thomson-Houston, Paris, France, a corporation
Filed Apr. 2, 1963, Ser. No. 270,073
Claims priority, application France, Apr. 12, 1962, 894,202, Patent 1,331,393
18 Claims. (Cl. 277—3)

The invention relates to rotary sealing arrangements for revolving shafts and the like.

In machinery involving shafts rotatable in bearings in a casing and projecting out of the casing, it is known to protect the shaft bearings and the interior of the casing against the ingress of foreign materials by providing a continuous small outflow of air or other fluid through clearances defined between the relatively rotatable surfaces and thus to maintain an overpressure within the inner space of the casing during rotation of the shaft. In the idle state of the machinery involved, such fluid outflow is usually discontinued since it would be wasteful of fluid and/or power to maintain it in action. This has the disadvantage of removing the protection during such idle periods and permitting the ingress of dirt at such times. An important object of this invention is to provide an improved rotary seal which will be free from this drawback in that it will afford continuous protection both during rotation and in the stationary condition of the shaft, without introducing objectionable friction during shaft rotation.

Further objects of the invention include the provision of an improved rotary seal system especially suitable for use in apparatus units designed for service outdoors and/or in dust- and dirt-laden atmospheres; the provision of such a system capable of being embodied in widely varying sizes and shapes so as to be practically usable both with very large diameter shafts, e.g. 1.5 meters or more such as in high-power generating plants or handling equipment, and with shaft diameters as small as a fraction of a millimeter, for example in delicate instrumentation and precision servo-mechanisms.

In accordance with an important aspect of the invention, a rotary-seal arrangement between two adjacent members rotatable relative to one another and defining an interior space to be protected against ingress of foreign materials, comprises means on said members defining a fluid-flow passage from said interior space to the exterior; seal means carried by one of the members and displaceable between a first position in engagement with the other member in which said flow passage is positively cut off, and a second position spaced from said other member in which said flow passage is opened; pressure-fluid flow means connected with said interior space for creating a positive over-pressure in said interior space with respect to the exterior; and means operable in the absence of relative rotation between said members to displace said seal means to said first position for positively sealing off the communication between said interior space and the exterior; and operable during relative rotation between said members to displace said seal means to its second position to permit the discharge of said pressure fluid through said passage.

Other objects of the invention will be apparent from the following description of embodiments thereof given for purposes of illustration but not of limitation with reference to the accompanying drawings, wherein.

Figure 1:
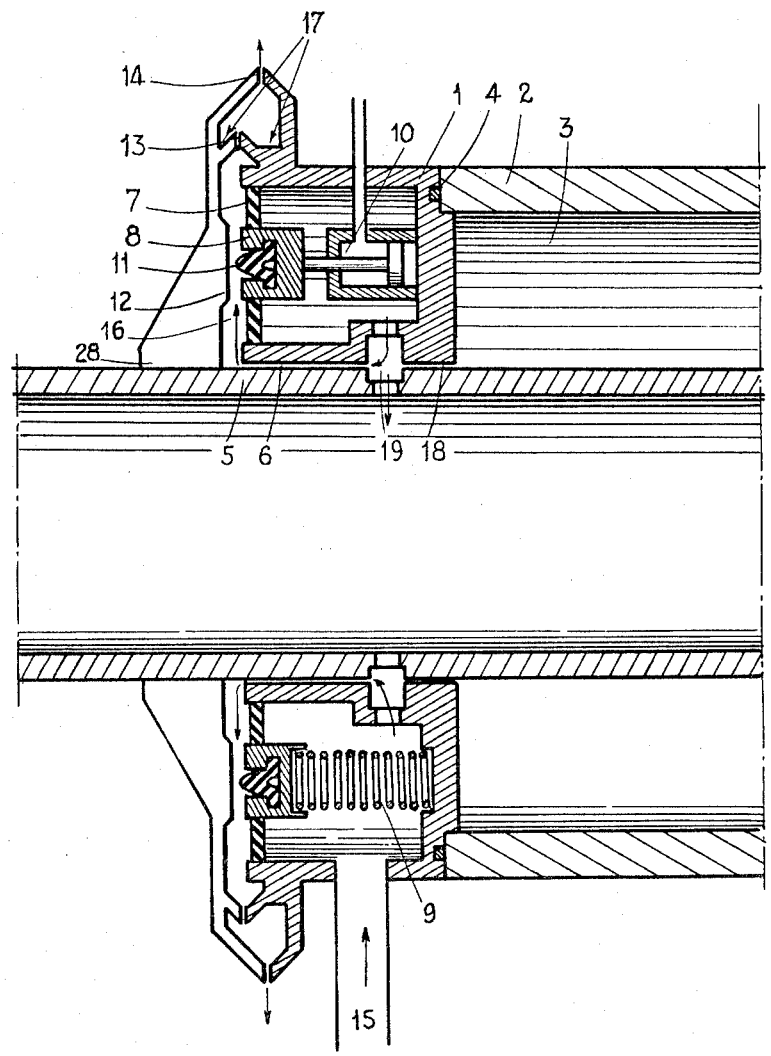
FIG. 1 is a somewhat simplified view of the improved rotary-seal means in axial section through a shaft with which it is associated, according to a first embodiment of the invention.

The embodiment illustrated in FIG. 1 is especially though not exclusively applicable for use with horizontally mounted large-diameter shafts. The shaft designated 5 is rotatable in bearings, not shown, within a stationary casing which includes a cylindrical wall 2 surrounding the shaft 5 and defining with its outer periphery the interior space or chamber 3. Secured to the end of the casing wall 2 is a generally stationary annular sealing structure comprising the annular casing 1 of generally rectangular cross-section, affixed to the casing wall 2 through means not shown, e.g. by bolts via an annular seal ring 4. The radially inner wall of annular casing 1 surrounds the periphery of shaft 5 with a small radial clearance as at 6. Projecting at an outward angle from the radially outer wall of annular housing 1 are lip-ilke baffles. The shaft 5 has a generally radial flange 28 secured to it so as to be rotatable with it a short distance in front of the stationary annular housing 1, and the flange 28 has lip-like baffles 13, 14 projecting from its outer end towards the stationary baffles so as to define a narrow axial clearance therewith. It will be noted that the cooperating lips or baffles 13–14 and their stationary counterparts define, in the embodiment shown, to axially offset annular gaps, each of a mitre-shape as shown and each gap having one stationary wall and one rotatable wall.

A ring member 8 is supported within the inner space of annular housing 1, by way of elastic diaphragm means 7 connecting the radially outer wall of ring 8 to the radially outer wall of annular housing 1, and the radially inner wall of ring 8 to the inner wall of housing 1. The ring 8, owing to the flexibility of diaphragm 7, is displaceable axially in the housing 1 a limited distance towards and away from the rotatable flange 28. The outwardly (to the left in FIG. 1) directed part of ring 8 is recessed, and the recess receives therein a flexible seal ring 11 which projects out of said recess towards a smooth annular surface 12 formed on the member 28 in radially registering relation with the ring 8.

Means are provided for biasing the ring 8 to the left according to the drawing to press the ring seal 11 into engagement with the rotating surface 12, and such biasing means are herein shown as a number of circumferentially spaced compression springs such as 9, acting between the right face of ring 8 and the inner end wall of annular housing 1. Means are also provided for retracting the ring 8 rightwards in opposition to said biasing means so as to retract the ring seal 11 from the bearing surface 12, and such retracting means are herein shown as a number of circumferentially spaced single-action pressure-fluid actuators 10, each including a small cylinder secured to the inner end wall of annular housing 1 and a piston slidable therein and connected by a piston rod to the ring member 8, as shown. Conveniently there may be three circumferentially spaced biassing springs 9 and three actuators 10. Application of pressure fluid to the left sides of the actuator cylinders 10 from a suitable source not shown, as by way of connections such as the one shown projecting from actuator 10 at the top of the figure, serves to retract the ring 8 and its seal 11 rightward in opposition to the biassing springs such as 9.

The annular chamber defined within the stationary housing 1 is connected as at 15 with a source of fluid under pressure, not shown, such as air at superatmospheric pressure. Said annular chamber is also connected through spaced radial passages with a pair of registering grooves 19 formed in the inner periphery of stationary housing 1 and the outer periphery of shaft 5, and thereby with the radial clearance 6 between the housing 1 and shaft. The grooves 19 also communicate through a further radial clearance 18 with the interior 3 of the casing. Moreover, in the illustrated example the shaft 5 is shown as being tubular and the grooves 19 also communicate through radial passages in the wall of the shaft with the interior recess of it. In this manner other similar rotary sealing devices can be fed with compressed air from the same source as at 15.

The arrangement described operates as follows: In the idle condition of the apparatus, with shaft 5 stationary, the pressure is disconnected from the actuators 10, by valve means not shown, so that the ring 8 is biased to the left by the springs 9 and the flexible seal 11, which may be made of any suitable flexible, resilient material, is pressed into tight engagement with the opposite annular surface 12. In this condition, the communication between the exterior and the inner space of the mechanism, such as the casing chamber 3 as well as the interior of the tubular shaft 5, is positively cut off, so that abrasive dirt particles and other foreign materials are prevented from entering said space and damaging the mechanism even should the apparatus remain for long periods out of doors in dust and/or sand-laden or humid and corrosive atmospheres. When the machinery of which the shaft 5 forms part is set into operation and the shaft 5 revolves, pressure fluid is applied to the actuators 10, through any suitable means, manual or preferably automatic. The ring 8 is thus retracted to the right (FIG. 1) and the ring seal 11 is retracted to a position spaced from the revolving surface 12, as shown in the drawing. The shaft 5 is thus able to revolve freely without the objectionable friction that would be present were the seal 11 to remain in engagement with surface 12. At the same time, filtered pressure air is delivered through the line 15 into the annular space within stationary housing 1, and this pressure air flows through the passages and grooves 19 into the annular clearance gap 6 and then radially outward through the annular passage provided between seal 11 and surface 12, and thence through the baffle passages at 13 and 14 and out to the atmosphere. The pressure air from groove 19 simultaneously flows through gap 18 into the inner space 3 of the casing and also, in this embodiment, into the recess of tubular shaft 5, maintaining superatmospheric pressure throughout the interior of the apparatus. It will be noted that the annular gap provided between the interior 3 of the casing 2 and the groove 19 serves to isolate said interior from the main air circuit, to minimize turbulence and similar effects liable to disturb thermal equilibrium and interfere with the uniform lubrication of the mechanism. The labyrinth baffle passages adjacent the lips 13 and 14 are a positive protection against the possible ingress of fast particles, such as wind-blown sand, against the outflowing blast of air. Any such particles would be caught in the annular troughs 17 and would not be able to penetrate any deeper. It will further be noted that in the stationary condition or shaft 5, when ring 8 is biased leftward by the springs 9, the flexible ring seal 11 is preferably arranged to be fully compressed into its seating groove within ring 8, so that the flat metallic facing surfaces of said groove then engage the metallic surface 12. Thus the metal-to-metal contact at said facing surfaces of ring 8 cooperate with the resilient engagement of flexible ring seal 11 between said surfaces to provide an extremely air-tight and reliable type of seal. Externally adjustable stop means, not shown, may be provided for adjusting the limit of axial displacement of the ring 8 and seal 11 in the retracting direction under the action of the actuators 10.

Figure 2:
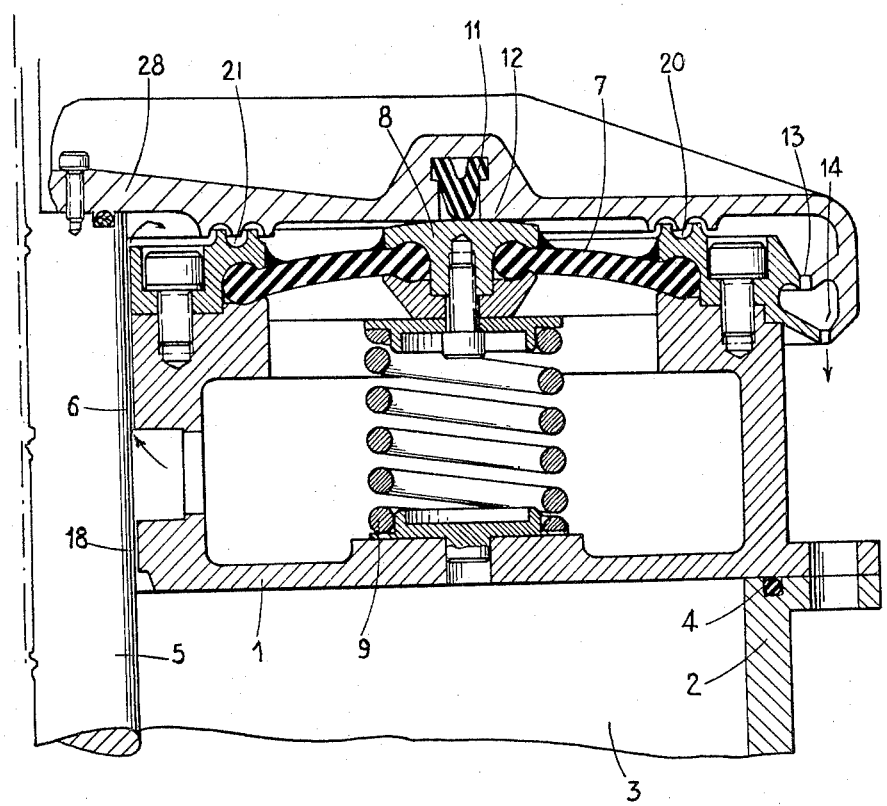
FIG. 2 is one half of an axial sectional view of the rotary-seal arrangement according to another embodiment of the invention, especially suitable for a vertical shaft.

The arrangement partly shown in FIG. 2 is basically the same as the one described and corresponding parts have been designated by the same reference numerals. In this case however, the shaft 5 is vertical. The flange 28 is shown as secured to the upper end of the shaft 5 rather than around its periphery as in FIG. 1. The showing in this figure is rather more detailed than in FIG. 1 and it will be noted that the stationary annular housing 1 is secured to the top of casing wall 2 by means of flanges and bolts (only the bolt holes are shown). It will also be noticed that the radially inner and outer peripheries of the flexible diaphragm 7 which serves to support the ring 8 for displacement parallel to the shaft axis, are secured to the corresponding walls of housing 1 by having peripheral beads of the diaphragm clamped to the annular housing walls by means of screwed-on retainer rings. One further difference of this over the preceding embodiment is that the flexible ring seal 11 instead of being seated in a groove of the ring member 8, is instead seated in a groove formed in the revolving flange 28; this avoids having an upwardly open groove in said ring which would be liable to collect dirt. For a somewhat similar reason the baffled passages 13 and 14 are shown opening downwardly to afford better protection in view of the vertical position of the shaft. An additional refinement is the provision of two radially spaced sets of annular baffle passages 20 and 21, provided by cooperating formations in the under surface of flange 28 and the upper surface of each of the afore-mentioned diaphragm retainer rings. The actuator means serving to retract the ring 8 downwardly in opposition to the biasing springs such as 9, have not been shown herein and it will be understood that such actuators may be positioned in radial planes other than the radial plane of section considered in FIG. 2. Otherwise the operation of the embodiment of FIG. 2 will be immediately understood in the light of the explanations previously given.

Figure 3:
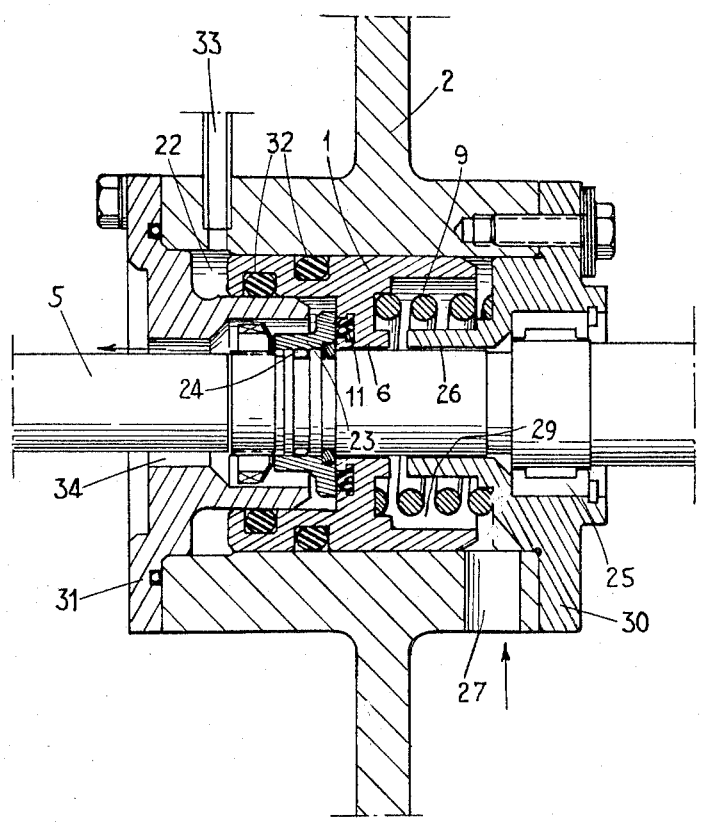
FIG. 3 is a view generally similar to FIG. 1 illustrating yet another embodiment of the invention especially applicable to small diameter shafts, e.g. in instrument servo-mechanisms.

FIG. 3 illustrates a somewhat simplified embodiment of the invention in a version which is especially suitable for use with small diameter shafts. Parts similar in function to parts in FIGS. 1 and 2 are designated by similar numerals. In this case, the casing 2 is shown as having a pair of end flanges 30 and 31 bolted to its opposite ends and the shaft 5 extends through aligned openings in the flanges. The annular sealing housing 1 is in this embodiment bodily displaceable axially within the inner chamber of the casing 2 around the shaft 5 and between the end flanges 30 and 31, packing rings 32 being provided in annular grooves formed in the outer and inner surfaces of said housing 2 for sliding cooperation with the inner wall surface of casing 2, and an outer peripheral surface of an inner annular boss of end flange 31 respectively, as shown. The annular housing 1 is axially urged in the leftward direction by a single helical compression spring 9 seated between a right-hand wall of said housing and end flange 30. Defined between the left end wall of annular housing 1, and the end flange 31 is an annular pressure chamber 22 having an inlet 33 for pressure fluid, e.g. oil connected to it for retracting the housing 1 rightward in opposition to spring 9. Formed in a leftwardly facing transverse surface of the annular housing 1 is an annular groove surrounding shaft 5 and having a flexible ring seal 11 seated in it. A flange 23 is secured around the shaft 5 by way of sealing means 24, so as to present its right-hand transverse end face, which is metallic in opposite relation to the ring seal 11 and the transverse surface of housing 1 in which said ring seal is embedded. Thus the spring 9 acting on housing 1 urges the ring seal and surrounding metal surface of housing 1 into tight engagement with the facing surface of flange 23, whereas oil pressure applied through inlet 33 into chamber 22 will retract housing 1 to move ring seal 11 away from flange 23.

In this embodiment filtered air under pressure can be delivered into the inner space 29 of casing 2 by way of a radial inlet 27 in the casing wall when the shaft 5 is rotated. At this time, pressure oil is also delivered through 33 into pressure chamber 22 to retract the annular housing 1 bodily rightward, whereupon the pressure air filling space 29 will flow by way of annular clearance passage 6 and through the passage now present between seal ring 11 and flange 23 and thence axially out of the casing through an annular outlet passage 34 in flange 31. Thus the inner space 29 of the casing is retained under positive pressure and ingress of dirt is prevented without interfering with the rotation of the shaft. When the apparatus is idle and shaft 5 stationary, the inflow of air at 27 can be stopped, and oil inlet 33 is disconnected from the source of pressure oil. Spring 9 now urges housing 1 bodily leftwards, so that the ring seal 11 and surrounding metal surface of housing 1 tightly engages the metal surface of flange 23, positively sealing the interior of the casing from the outer atmosphere. If desired, baffle means such as 13–14 in FIG. 1, or 21 and 22 in FIG. 2, may also be provided in this embodiment.

It will be clear that various other changes and modifications may be made in the exemplary embodiments illustrated and described depending on the particular applications of the device. One important modification that is contemplated is the combination of the pressure seal described with air-pressure bearing means for the rotatable shaft in its casing. Thus, referring for example to FIG. 1, it will be understood that if the air pressure delivered at 15 during rotation of the shaft is high enough, somewhat higher than the pressure strictly required for the operation of the sealing means described, the film or cushion of pressure air in the annular clearance gaps 6–18 may be used as a dynamic means for supporting the shaft 5, assisting or replacing any antifriction or other conventional bearing means for the shaft.

What is claimed is:

1. A rotary-seal arrangement interposable between two adjacent, relatively rotatable members defining an interior space to be protected against ingress of foreign materials, said arrangement comprising means defining a fluid-flow passage from said interior space to the exterior, cooperating sealing means respectively carried by said members and relatively displaceable towards and away from each other so as positively and selectively to seal off, and to open, said passage, means connected with said interior space for applying a gaseous fluid under pressure, thereto, means operable in the absence of relative rotation between the members to displace said cooperating sealing means toward one another positively to seal off said passage, and means operable during relative rotation between the members to displace said sealing means away from each other to permit continuous discharge of said gaseous fluid through the passage, said gaseous fluid constituting the sole sealing medium operative during relative rotation of said members.

2. The arrangement claimed in claim 1, wherein the cooperating sealing means comprises a pair of interengageable hard smooth surfaces carried by the respective members, a groove formed in one of said hard surfaces and a yielding sealing element seated in said groove and compressible into tight engagement with the other hard surface on interengagement between both hard surfaces.

3. The arrangement claimed in claim 1, wherein the means for displacing the sealing means towards each other comprises spring means.

4. The arrangement claimed in claim 1, wherein the means for displacing the sealing means away from each other comprises fluid-pressure actuator means.

5. In an assembly comprising a shaft rotatable in a casing and defining therewith an interior space, a rotary-seal arrangement for said space comprising a first transverse annular surface coaxial with said shaft and rotatable therewith, an annular element coaxially surrounding said shaft and having a second transverse surface directed towards but adapted to be spaced from the first surface, means defining a fluid-flow passage from said interior space to the exterior, said passage including the space between said surfaces, means operable in a stationary condition of the shaft for displacing said element axially relative to the casing in one direction for seating said second surface against said first surface to cut off said passage, means operable in a rotating condition of the shaft for displacing said element in the opposite direction for opening said passage, and means for injecting gaseous fluid under pressure into said space for discharge through said passage in the rotated condition of the shaft, said gaseous fluid constituting the sole sealing fluid medium operative during rotation of said shaft.

6. The assembly defined in claim 5, wherein said surfaces comprise interengageable metallic surfaces, and including an annular groove formed coaxial with the shaft in one of said surfaces and a ring seal of yielding material seated in said groove and projecting therefrom so as to be pressed into tight engagement with the other surface when said surfaces interengage.

7. The assembly defined in claim 5, wherein the means for displacing said element in said one direction comprise spring means biasing the element in said one direction and said means for displacing the element in the opposite direction comprise fluid pressure actuator means selectively operable to overpower said spring means.

8. The assembly defined in claim 5, further comprising an annular casing section secured to said casing and defining an annular space communicating with said interior space of the casing, and flexible diaphragm means supporting said annular element across one transverse end wall of said casing section for limited axial displacement while sealing said annular space from the exterior.

9. The assembly defined in claim 8, wherein said casing section surrounds said shaft with an annular clearance that forms part of said fluid flow passage.

10. The assembly defined in claim 8, wherein the means for displacing said annular element in said one direction comprises a plurality of circumferentially spaced springs in said casing section biasing the element in said one direction, and the means for displacing the annular element in said other direction comprises a plurality of circumferentially spaced fluid pressure actuators positioned in said casing section and operable to overpower said springs.

11. The assembly defined in claim 5, wherein said annular element constitutes a sleeve-like piston member coaxially surrounding the shaft and bodily slidable axially within the casing and including a transverse annular wall one side of which includes said second transverse surface, and the other side of which defines said interior space with the casing.

12. The assembly defined in claim 11, wherein said sleeve-like piston member surrounds the shaft with an annular clearance forming part of said fluid flow passage.

13. The assembly defined in claim 11, wherein the means for displacing said annular element in said one direction comprises spring means urging said sleeve-like piston member axially in said one direction, and the means for displacing the annular element in said other direction comprises an annular fluid pressure chamber defined between said casing and said one end of the piston member and selectively connectable with a source of pressure fluid to create a pressure within said pressure chamber to overpower said spring means.

14. The assembly defined in claim 5, including flange elements carried by the respective members and defining narrow annular passages therebetween as parts of said fluid flow passage, said narrow passages being axially offset to provide a baffle arrangement positively preventing the ingress of foreign particles into said fluid flow passage during rotation of the shaft.

15. In an assembly comprising a shaft rotatable in a stationary casing, said casing including a circumferential wall spaced radially around said shaft and defining therewith an annular space, a rotary seal arrangement for said space at an axial end of said casing, said arrangement comprising:
- a transverse flange extending from said shaft and having a first transverse annular surface directed towards said casing;
- an annular element within the casing coaxially surrounding the shaft and having a second transverse surface directed away from the casing and towards said first surface, said first and second surfaces defining therebetween a flow passage from the interior of the casing to the exterior;
- means supporting said annular element on said casing for axial displacement relative thereto toward and away from said flange;
- means operable in a stationary condition of the shaft for displacing said element in the direction of said flange to seat said second surface against said first surface and cut off said passage;
- means operable in a rotating condition of the shaft for displacing said element in the opposite direction away from said flange for opening said passage; and
- means for injecting a gaseous fluid under pressure into said casing for discharge through said passage in the rotated condition of the shaft whereby said gaseous fluid constitutes the sole sealing medium operative during rotation of said shaft, said flange constituting the sole end closure for said casing at said axial end thereof.

16. The assembly defined in claim 15, further comprising baffle elements provided on facing surfaces of said flange and said casing wall respectively, at positions radially outward of said first and second surfaces thereof, said baffles co-operating to define narrow axially offset annular passages therebetween as parts of said fluid flow passage, for preventing the ingress of foreign particles into said passage during rotation of the shaft.

17. The assembly defined in claim 15 wherein said surfaces comprise interengageable metallic surfaces, and including an annular groove formed coaxial with the shaft in one of said surfaces and a ring seal of yielding material seated in said groove and projecting therefrom so as to be pressed into tight engagement with the other surface when said surfaces interengage in the stationary condition of the shaft.

18. The assembly defined in claim 15, wherein the means for displacing said element towards said flange comprises spring means and said means for displacing the element away from the flange comprises fluid-pressure actuator means.

References Cited by the Examiner

UNITED STATES PATENTS

| | | | |
|---|---|---|---|
| 1,840,127 | 1/1932 | Penney | 308—36.3 |
| 1,903,210 | 3/1933 | Carrier | 277—73 |
| 2,326,824 | 8/1943 | Browne et al. | 277—65 |
| 2,768,011 | 10/1956 | Mosher | 277—96 |

FOREIGN PATENTS

| | | |
|---|---|---|
| 962,918 | 12/1949 | France. |
| 1,268,692 | 6/1961 | France. |
| 24,570 | 1904 | Great Britain. |

SAMUEL ROTHBERG, *Primary Examiner.*

LEWIS J. LENNY, *Examiner.*

E. DOWNS, *Assistant Examiner.*